US012571427B2

(12) United States Patent
Yamauchi et al.

(10) Patent No.: US 12,571,427 B2
(45) Date of Patent: *Mar. 10, 2026

(54) BEARING PART

(71) Applicant: NTN Corporation, Osaka (JP)

(72) Inventors: Kiyoshige Yamauchi, Iwata (JP);
Takamichi Harada, Iwata (JP);
Chikara Ohki, Kuwana (JP); **Masahiro
Yamada**, Kuwana (JP)

(73) Assignee: NTN Corporation, Osaka (JP)

( * ) Notice: Subject to any disclaimer, the term of this
patent is extended or adjusted under 35
U.S.C. 154(b) by 501 days.

This patent is subject to a terminal dis-
claimer.

(21) Appl. No.: 17/765,758

(22) PCT Filed: Sep. 28, 2020

(86) PCT No.: PCT/JP2020/036661
§ 371 (c)(1),
(2) Date: Mar. 31, 2022

(87) PCT Pub. No.: WO2021/065809
PCT Pub. Date: Apr. 8, 2021

(65) Prior Publication Data
US 2022/0389960 A1    Dec. 8, 2022

(30) Foreign Application Priority Data

Oct. 1, 2019    (JP) ................................. 2019-181590

(51) Int. Cl.
*C21D 1/06* (2006.01)
*C21D 9/40* (2006.01)
(Continued)

(52) U.S. Cl.
CPC ............... *F16C 33/14* (2013.01); *C21D 1/06*
(2013.01); *C21D 9/40* (2013.01); *F16C 33/121*
(2013.01);
(Continued)

(58) Field of Classification Search
CPC .... F16C 33/14; F16C 33/121; F16C 2223/10;
F16C 2240/48; F16C 17/02; F16C
33/124;
(Continued)

(56) References Cited

U.S. PATENT DOCUMENTS 5,084,116 A    1/1992 Mitamura
5,338,377 A *  8/1994 Mitamura ............... F16C 33/62
148/318
(Continued)

FOREIGN PATENT DOCUMENTS

CA    2712096 A1    8/2009
CN    1421541 A    6/2003
(Continued)

OTHER PUBLICATIONS

The International Search Report issued in International Application
No. PCT/JP2020/036661, mailed on Nov. 24, 2020 w/English
Translation.
(Continued)

*Primary Examiner* — John A Hevey
(74) *Attorney, Agent, or Firm* — Rimon P.C.

(57) ABSTRACT

A bearing part includes a quench-hardened layer in a surface
of the bearing part. The quench-hardened layer includes a
plurality of martensite crystal grains. A ratio of a total area
of the plurality of martensite crystal grains in the quench-
hardened layer is more than or equal to 70%. The plurality
of martensite crystal grains are classified into a first group
and a second group. A minimum value of crystal grain sizes
of the martensite crystal grains belonging to the first group
is larger than a maximum value of crystal grain sizes of the
martensite crystal grains belonging to the second group. A
value obtained by dividing a total area of the martensite
crystal grains belonging to the first group by the total area of
(Continued)

the plurality of martensite crystal grains is more than or equal to 0.5.

3 Claims, 15 Drawing Sheets

(51) Int. Cl.
*F16C 33/12* (2006.01)
*F16C 33/14* (2006.01)

(52) U.S. Cl.
CPC .... *C21D 2211/008* (2013.01); *C21D 2221/10* (2013.01); *F16C 2223/10* (2013.01); *F16C 2240/48* (2013.01)

(58) Field of Classification Search
CPC .............. F16C 2204/70; F16C 2223/06; F16C 11/045; F16C 2361/61; F16C 19/26; F16C 33/581; F16C 33/62; F16C 35/077; C21D 1/06; C21D 9/40; C21D 2211/008; C21D 2221/10; C21D 1/26; C21D 2211/001; C21D 2261/00; C21D 1/18; C21D 1/74; C21D 9/28; C21D 1/78; C22C 38/18; C22C 38/22; C22C 38/00
See application file for complete search history.

(56) References Cited

U.S. PATENT DOCUMENTS

| | | | |
|---|---|---|---|
| 5,660,647 A | 8/1997 | Mitamura et al. | |
| 5,672,014 A | 9/1997 | Okita et al. | |
| 5,853,249 A | 12/1998 | Maeda et al. | |
| 6,071,358 A | 6/2000 | Okita et al. | |
| 6,095,692 A | 8/2000 | Takemura | |
| 6,149,734 A | 11/2000 | Isogai et al. | |
| 6,290,398 B1 | 9/2001 | Fujiwara et al. | |
| 8,535,457 B2 | 9/2013 | Maeda | |
| 8,591,371 B2 * | 11/2013 | Dinter ................. | F16C 33/1055 |
| | | | 475/160 |
| 11,137,031 B2 | 10/2021 | Yamada et al. | |
| 12,163,555 B2 | 12/2024 | Yamada et al. | |
| 2001/0001396 A1 | 5/2001 | Takayama et al. | |
| 2003/0123769 A1 | 7/2003 | Ohki | |
| 2006/0162823 A1 | 7/2006 | Omori et al. | |
| 2006/0204155 A1 | 9/2006 | Watanabe et al. | |
| 2007/0196039 A1 * | 8/2007 | Kawaguchi .......... | F16H 57/021 |
| | | | 384/625 |
| 2008/0006347 A1 | 1/2008 | Kizawa et al. | |
| 2008/0047633 A1 | 2/2008 | Kizawa et al. | |
| 2008/0118196 A1 | 5/2008 | Watanabe et al. | |
| 2008/0163839 A1 | 7/2008 | Watanabe et al. | |
| 2010/0150489 A1 | 6/2010 | Maeda | |
| 2010/0296764 A1 | 11/2010 | Strandell et al. | |
| 2012/0020605 A1 | 1/2012 | Mori | |
| 2013/0016937 A1 | 1/2013 | Tsutsui et al. | |
| 2013/0183191 A1 | 7/2013 | Kaizuka et al. | |
| 2013/0301969 A1 | 11/2013 | Yuki et al. | |
| 2014/0099051 A1 | 4/2014 | Yoshida et al. | |
| 2014/0254970 A1 * | 9/2014 | Guilford ............... | F16C 43/065 |
| | | | 29/898.064 |
| 2014/0299237 A1 | 10/2014 | Somani et al. | |
| 2014/0363115 A1 | 12/2014 | Yamada et al. | |
| 2015/0259764 A1 | 9/2015 | Hidaka et al. | |
| 2016/0123397 A1 | 5/2016 | Sato et al. | |
| 2016/0289785 A1 | 10/2016 | Matsuzawa et al. | |
| 2016/0333437 A1 | 11/2016 | Sakamoto et al. | |
| 2016/0333438 A1 | 11/2016 | Sakamoto et al. | |
| 2017/0121786 A1 | 5/2017 | Miyamoto et al. | |
| 2017/0314117 A1 * | 11/2017 | Yoshida ................... | C21D 9/28 |
| 2017/0328408 A1 | 11/2017 | Hosseini et al. | |
| 2018/0363694 A1 * | 12/2018 | Ohno ................... | F16C 33/586 |
| 2020/0003259 A1 * | 1/2020 | Yamada ................. | F16C 33/34 |
| 2020/0172990 A1 | 6/2020 | Nishida | |

| | | | |
|---|---|---|---|
| 2020/0378442 A1 | 12/2020 | Yamada et al. | |
| 2021/0025452 A1 | 1/2021 | Ohki et al. | |
| 2022/0389960 A1 | 12/2022 | Yamauchi et al. | |
| 2022/0411891 A1 * | 12/2022 | Kawai ..................... | F16C 33/64 |
| 2024/0035515 A1 * | 2/2024 | Fujimura ............... | F16C 33/34 |

FOREIGN PATENT DOCUMENTS

| | | | |
|---|---|---|---|
| CN | 1611628 A | 5/2005 | |
| CN | 1701128 A | 11/2005 | |
| CN | 1946863 A | 4/2007 | |
| CN | 1993561 A | 7/2007 | |
| CN | 102362000 A | 2/2012 | |
| CN | 102822546 A | 12/2012 | |
| CN | 103237913 A | 8/2013 | |
| CN | 103710517 A | 4/2014 | |
| CN | 105121877 A | 12/2015 | |
| CN | 105671447 A | 6/2016 | |
| CN | 105745338 A | 7/2016 | |
| CN | 107746948 A | 3/2018 | |
| CN | 112119169 A | 12/2020 | |
| EP | 1517058 A1 | 3/2005 | |
| EP | 1701052 A2 | 3/2006 | |
| EP | 2789709 A1 | 10/2014 | |
| JP | H02-277764 A | 11/1990 | |
| JP | H03-64431 A | 3/1991 | |
| JP | H05-078814 | 3/1993 | |
| JP | H08-49057 A | 2/1996 | |
| JP | H08-303470 A | 11/1996 | |
| JP | H08-311603 A | 11/1996 | |
| JP | H10-176219 A | 6/1998 | |
| JP | H11-201168 A | 7/1999 | |
| JP | H11-217626 A | 8/1999 | |
| JP | 2001-073035 A | 3/2001 | |
| JP | 2001-323939 A | 11/2001 | |
| JP | 2001-330101 A | 11/2001 | |
| JP | 2002206523 A | 7/2002 | |
| JP | 2003-129176 A | 5/2003 | |
| JP | 2003-226919 A | 8/2003 | |
| JP | 2005-090680 A | 4/2005 | |
| JP | 2005-298877 A | 10/2005 | |
| JP | 2005-314789 A | 11/2005 | |
| JP | 2006-063353 A | 3/2006 | |
| JP | 2006-083988 A | 3/2006 | |
| JP | 2006-144889 A | 6/2006 | |
| JP | 2006-250294 A | 9/2006 | |
| JP | 2006-329268 A | 12/2006 | |
| JP | 2007-016848 A | 1/2007 | |
| JP | 3905430 B2 | 4/2007 | |
| JP | 2007-113027 A | 5/2007 | |
| JP | 2007-182603 A | 7/2007 | |
| JP | 2007-182609 A | 7/2007 | |
| JP | 2007-182926 A | 7/2007 | |
| JP | 2007-232201 A | 9/2007 | |
| JP | 2007-255485 A | 10/2007 | |
| JP | 4114218 B2 | 7/2008 | |
| JP | 2008-208401 A | 9/2008 | |
| JP | 2008-255399 A | 10/2008 | |
| JP | 2008-285725 A | 11/2008 | |
| JP | 2010-222678 A | 10/2010 | |
| JP | 2011-184768 A | 9/2011 | |
| JP | 2012-062515 A | 3/2012 | |
| JP | 2013-011010 A | 1/2013 | |
| JP | 2013-160314 A | 8/2013 | |
| JP | 2014-101896 A | 6/2014 | |
| JP | 5592540 B1 | 9/2014 | |
| JP | 2015-094015 A | 5/2015 | |
| JP | 2018-168433 A | 11/2018 | |
| JP | 2019-039044 A | 3/2019 | |
| JP | 2019-059983 A | 4/2019 | |
| JP | 2019-108576 A | 7/2019 | |
| JP | 2019-178727 A | 10/2019 | |
| JP | 6626918 B2 | 12/2019 | |
| WO | 2006/068205 A1 | 6/2006 | |
| WO | 2015/105186 A1 | 7/2015 | |
| WO | 2015/105187 A1 | 7/2015 | |
| WO | 2016/194272 A1 | 12/2016 | |

(56)  References Cited

FOREIGN PATENT DOCUMENTS

| WO | WO-2017099071 A1 | * | 6/2017 | .............. C21D 9/40 |
| WO | WO-2018159840 A1 | * | 9/2018 | .............. C21D 1/06 |
| WO | 2019/065622 A1 | | 4/2019 | |

OTHER PUBLICATIONS

International Search Report issued in corresponding International Patent Application No. PCT/JP2020/034079 dated Nov. 24, 2020, with English translation.

Chinese Office Action issued in corresponding Chinese Patent Application No. 201980023867.X, dated Aug. 22, 2022, with English Translation.

Chinese Office Action issued in corresponding Chinese Patent Application No. 201980023867.X, dated Feb. 8, 2022, with English translation.

Extended European Search Report issued in corresponding European Patent Application No. 19776628.0, dated Oct. 19, 2021.

International Search Report issued in corresponding International Patent Application No. PCT/JP2019/012700 dated Jun. 25, 2019, with English translation.

International Search Report issued in International Application No. PCT/JP2021/034141, mailed on Nov. 16, 2021 w/English Translation.

JFS; "SUJ2", https://www.jfs-steel.com/en/product/SUJ2.html; retrieved on Nov. 22, 2024 (Year: 2024).

Cronidur ® 30, "Energietechnik Essen", Maximum Demand by Corrosive Stress Wear, retrieved from internet on May 21, 2025; https://progalloysteel.wpengine.com/wp-content/uploads/2020/02cronidur30.pdf (Year: 2008).

Celada-Casero, et al., "The role of the austenite grain size in the martensitic transformation in low carbon steels," Materials and Design, 167 (2019) 107625, pp. 1-10 (Year: 2019).

International Search Report issued in corresponding International Patent Application No. PCT/JP2018/044709, dated Feb. 19, 2019, with English translation.

Extended European Search Report issued in corresponding European Patent Application No. 18760826.0, dated Jul. 3, 2020.

International Search Report issued in corresponding International Patent Application No. PCT/JP2018/008149 dated May 1, 2018, with English translation.

Japanese Office Action issued in corresponding Japanese Patent Application No. 2017-241498, dated Dec. 22, 2020, with English translation.

Chinese Office Action issued in corresponding Chinese Patent Application No. 201880015417.1, dated Jun, 9, 2021, with English translation.

Japanese Office Action issued in corresponding Japanese Patent Application No. 2021-006648, dated Sep. 21, 2021, with English translation.

Japanese Office Action issued in corresponding Japanese Patent Application No. 2021-006650, dated Sep. 21, 2021, with English translation.

Japanese Office Action issued in corresponding Japanese Patent Application No. 2021-006653, dated Sep. 21, 2021, with English translation.

Chinese Office Action issued in corresponding Chinese Patent Application No. 201880015417.1, dated Apr. 20, 2022, with English translation.

"Metal Materials and Heat Treatment," compiled by the Agricultural Machinery Industry Bureau of the Ministry of Machinery Industry, Machinery Industry Press, Aug. 1987, p. 108, with partial English translation.

* cited by examiner

BEARING PART

CROSS REFERENCE TO RELATED APPLICATIONS

This application is the U.S. National Phase under 35 U.S.C. § 371 of International Application No. PCT/JP2020/036661, filed on Sep. 28, 2020, which claims the benefit of Japanese Application No. 2019-181590, filed on Oct. 1, 2019, the entire contents of which are hereby incorporated by reference.

TECHNICAL FIELD

The present invention relates to a bearing part. More particularly, the present invention relates to a rolling element used for a rocker arm bearing, a shaft used for the rocker arm bearing, and a shaft used for a planetary gear mechanism bearing.

BACKGROUND ART

A rolling fatigue life of a bearing part is improved by carbonitriding a surface of the bearing part (a raceway surface of each of an inner ring and an outer ring as well as a rolling contact surface of a rolling element) as described in Patent Literature 1 (Japanese Patent No. 5592540). Moreover, the rolling fatigue life of the rolling bearing is improved by attaining fine prior austenite grains in the surface of the bearing part as described in Patent Literature 2 (Japanese Patent No. 3905430).

CITATION LIST

Patent Literature

PTL 1: Japanese Patent No. 5592540
PTL 2: Japanese Patent No. 3905430

SUMMARY OF INVENTION

Technical Problem

A steel used for the bearing part is generally quenched. That is, a quench-hardened layer having a structure mainly composed of a martensite phase is formed in the surface of the bearing part. However, it has not been conventionally known how states of martensite crystal grains affect the rolling fatigue life of the bearing part.

A locally high surface pressure may be applied to a rolling element or shaft of a rocker arm bearing due to an influence of an attachment error, imbalance of load, or the like. Further, since the rocker arm bearing is used inside an engine, a foreign matter may be introduced into a lubricant or deterioration of the lubricant may be caused. Further, since the rocker arm bearing is a full complement roller bearing, the following matters may occur: interference between rolling elements (rollers); occurrence of skew with respect to a roller; an insufficient amount of supply of lubricant between the bearing ring and the roller; and the like. This may cause a shorter rolling fatigue life of the rolling element or shaft of the rocker arm bearing than expected, and therefore, it has been desired to improve the rolling fatigue life. Similarly, it has been desired to improve the rolling fatigue life of a shaft used for a planetary gear mechanism bearing.

The present invention has been made in view of the above-described problem of the conventional art. More specifically, the present invention is to provide a bearing part having an improved rolling fatigue life.

Solution to Problem

A bearing part according to a first implementation of the present invention is a rolling element used for a rocker arm bearing, a shaft used for the rocker arm bearing, or a shaft used for a planetary gear mechanism bearing. The bearing part includes a quench-hardened layer in a surface of the bearing part. The quench-hardened layer includes a plurality of martensite crystal grains. A ratio of a total area of the plurality of martensite crystal grains in the quench-hardened layer is more than or equal to 70%. The plurality of martensite crystal grains are classified into a first group and a second group. A minimum value of crystal grain sizes of the martensite crystal grains belonging to the first group is larger than a maximum value of crystal grain sizes of the martensite crystal grains belonging to the second group. A value obtained by dividing a total area of the martensite crystal grains belonging to the first group by the total area of the plurality of martensite crystal grains is more than or equal to 0.5. A value obtained by dividing, by the total area of the plurality of martensite crystal grains, a total area of the martensite crystal grains belonging to the first group except for a martensite crystal grain that has a minimum crystal grain size and that belongs to the first group is less than 0.5. An average grain size of the martensite crystal grains belonging to the first group is less than or equal to 0.97 μm. The steel is high-carbon chromium bearing steel SUJ2 defined in JIS.

A bearing part according to a second implementation of the present invention is a rolling element used for a rocker arm bearing, a shaft used for the rocker arm bearing, or a shaft used for a planetary gear mechanism bearing. The bearing part includes a quench-hardened layer in a surface of the bearing part. The quench-hardened layer includes a plurality of martensite crystal grains. A ratio of a total area of the plurality of martensite crystal grains in the quench-hardened layer is more than or equal to 70%. The plurality of martensite crystal grains are classified into a first group and a second group. A minimum value of crystal grain sizes of the martensite crystal grains belonging to the first group is larger than a maximum value of crystal grain sizes of the martensite crystal grains belonging to the second group. A value obtained by dividing a total area of the martensite crystal grains belonging to the first group by the total area of the plurality of martensite crystal grains is more than or equal to 0.5. A value obtained by dividing, by the total area of the plurality of martensite crystal grains, a total area of the martensite crystal grains belonging to the first group except for a martensite crystal grain that has a minimum crystal grain size and that belongs to the first group is less than 0.5. An average grain size of the martensite crystal grains belonging to the first group is less than or equal to 0.97 μm. An average aspect ratio of the martensite crystal grains belonging to the first group is less than or equal to 2.57.

A bearing part according to a third implementation of the present invention is a rolling element used for a rocker arm bearing, a shaft used for the rocker arm bearing, or a shaft used for a planetary gear mechanism bearing. The bearing part includes a quench-hardened layer in a surface of the bearing part. The quench-hardened layer includes a plurality of martensite crystal grains. A ratio of a total area of the plurality of martensite crystal grains in the quench-hardened layer is more than or equal to 70%. The plurality of martensite crystal grains are classified into a third group and a fourth group. A minimum value of crystal grain sizes of the martensite crystal grains belonging to the third group is larger than a maximum value of crystal grain sizes of the martensite crystal grains belonging to the fourth group. A value obtained by dividing a total area of the martensite crystal grains belonging to the third group by the total area of the plurality of martensite crystal grains is more than or equal to 0.7. A value obtained by dividing, by the total area of the plurality of martensite crystal grains, a total area of the martensite crystal grains belonging to the third group except for a martensite crystal grain that has a minimum crystal grain size and that belongs to the third group is less than 0.7. An average grain size of the martensite crystal grains belonging to the third group is less than or equal to 0.75 μm. The steel is high-carbon chromium bearing steel SUJ2 defined in JIS.

The bearing part according to a fourth implementation of the present invention is a rolling element used for a rocker arm bearing, a shaft used for the rocker arm bearing, or a shaft used for a planetary gear mechanism bearing. The bearing part includes a quench-hardened layer in a surface of the bearing part. The quench-hardened layer includes a plurality of martensite crystal grains. A ratio of a total area of the plurality of martensite crystal grains in the quench-hardened layer is more than or equal to 70%. The plurality of martensite crystal grains are classified into a third group and a fourth group. A minimum value of crystal grain sizes of the martensite crystal grains belonging to the third group is larger than a maximum value of crystal grain sizes of the martensite crystal grains belonging to the fourth group. A value obtained by dividing a total area of the martensite crystal grains belonging to the third group by the total area of the plurality of martensite crystal grains is more than or equal to 0.7. A value obtained by dividing, by the total area of the plurality of martensite crystal grains, a total area of the martensite crystal grains belonging to the third group except for a martensite crystal grain that has a minimum crystal grain size and that belongs to the third group is less than 0.7. An average grain size of the martensite crystal grains belonging to the third group is less than or equal to 0.75 μm. An average aspect ratio of the martensite crystal grains belonging to the third group is less than or equal to 2.45.

In the bearing part, a hardness of the quench-hardened layer in the surface may be more than or equal to 730 Hv.

In the bearing part, the quench-hardened layer may contain nitrogen. An average nitrogen concentration of the quench-hardened layer may be more than or equal to 0.15 mass % between the surface and a position at a distance of 10 μm from the surface. In the bearing part, the quench-hardened layer may include a plurality of austenite crystal grains. A volume ratio of the plurality of austenite crystal grains in the quench-hardened layer may be less than or equal to 30%.

Advantageous Effects of Invention

According to the bearing part according to each of the first to fourth implementations of the present invention, a rolling fatigue life can be improved.

BRIEF DESCRIPTION OF DRAWINGS

FIG. 2 is an enlarged cross sectional view of a rolling element 13 in the vicinity of an outer peripheral surface 13a.

FIG. 3 is an enlarged cross sectional view of a shaft 11 in the vicinity of an outer peripheral surface 11a.
FIG. 7 is an enlarged cross sectional view of a shaft 21 in the vicinity of an outer peripheral surface 21a.

DESCRIPTION OF EMBODIMENTS

Figure 1:
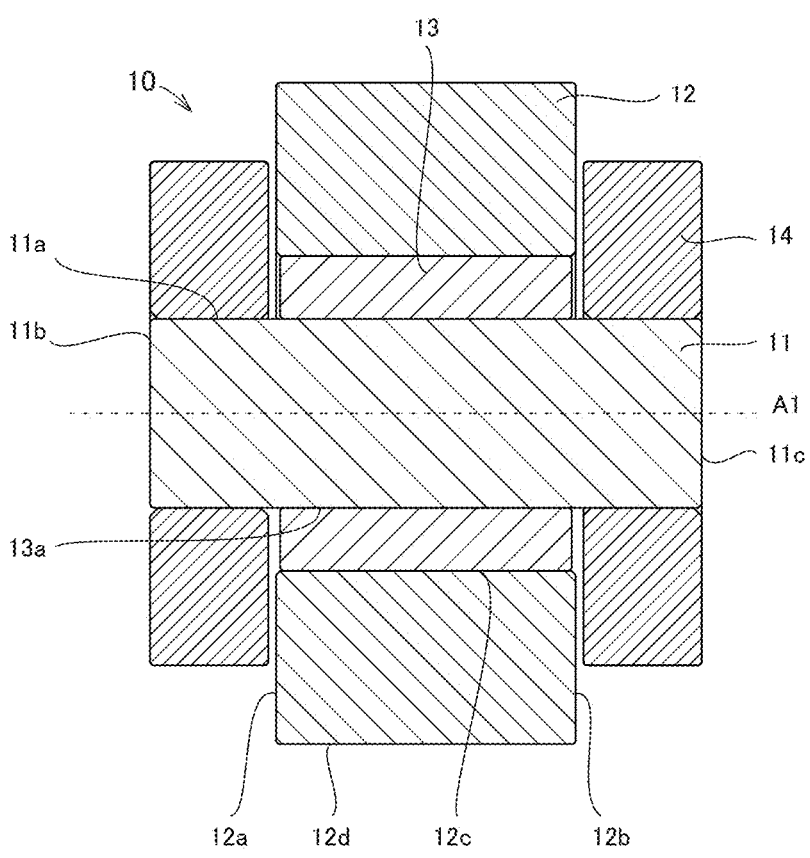
FIG. 1 is a cross sectional view of a bearing 10.

Details of embodiments will be described with reference to figures. In the below-described figures, the same or corresponding portions are denoted by the same reference characters, and will not be described repeatedly.

First Embodiment

Hereinafter, a configuration of a rocker arm bearing (hereinafter, referred to as "bearing 10") according to a first embodiment will be described.

FIG. 1 is a cross sectional view of bearing 10. As shown in FIG. 1, bearing 10 includes a shaft 11, an outer ring 12, and a rolling element 13. Each of shaft 11, outer ring 12 and rolling element 13 is composed of a steel. More specifically, each of shaft 11, outer ring 12, and rolling element 13 is composed of a bearing steel. Each of shaft 11, outer ring 12 and rolling element 13 is preferably composed of high-carbon chromium bearing steel SUJ2 defined in JIS (JIS G 4805: 2008). Each of shaft 11, outer ring 12 and rolling element 13 may be composed of high-carbon chromium bearing steel SUJ3 defined in JIS, 52100 defined in ASTM, 100Cr6 defined in DIN, or GCr5 (GCr15) defined in GB.

Shaft 11 has an outer peripheral surface 11a. Outer peripheral surface 11a serves as a raceway surface (surface to be in contact with rolling element 13). Shaft 11 has a cylindrical shape, for example. Shaft 11 may be solid or hollow. Shaft 11 has a central axis A1. Shaft 11 has a first end 11b and a second end 11c in an axial direction (direction along central axis A1). Second end 11c is an end opposite to first end 11b. Shaft 11 is fixed to a rocker arm 14 at first end 11b and second end 11c. Rocker arm 14 is pushed and moved by a cam (not shown) and is accordingly rocked. By rocking rocker arm 14, shaft 11 is rotated about central axis A1.

Outer ring 12 has an annular shape (ring shape). Outer ring 12 has an upper surface 12a, a bottom surface 12b, an inner peripheral surface 12c, and an outer peripheral surface 12d. Upper surface 12a and bottom surface 12b constitute end surfaces of outer ring 12 in an axial direction. Bottom surface 12b is a surface opposite to upper surface 12a in the axial direction.

Each of inner peripheral surface 12c and outer peripheral surface 12d extends along a peripheral direction (direction along a perimeter having central axis A1 as its center). Inner peripheral surface 12c faces the central axis A1 side, and outer peripheral surface 12d faces the side opposite to central axis A1. That is, outer peripheral surface 12d is a surface opposite to inner peripheral surface 12c in a radial direction (direction passing through central axis A1 and orthogonal to central axis A1). Outer ring 12 is disposed such that inner peripheral surface 12c faces outer peripheral surface 11a. Inner peripheral surface 12c serves as a raceway surface.

Rolling element 13 has a cylindrical shape extending along the axial direction. Specifically, rolling element 13 is a needle roller. Rolling element 13 has an outer peripheral surface 13a. Outer peripheral surface 13a serves as a rolling contact surface. Rolling element 13 is disposed between shaft 11 and outer ring 12 such that outer peripheral surface 13a is in contact with outer peripheral surface 11a and inner peripheral surface 12c. Thus, shaft 11 is supported rotatably about central axis A1. Bearing 10 does not have a cage. That is, bearing 10 is a full complement roller bearing.

<Detailed Configuration of Rolling Element 13>

Figure 2:
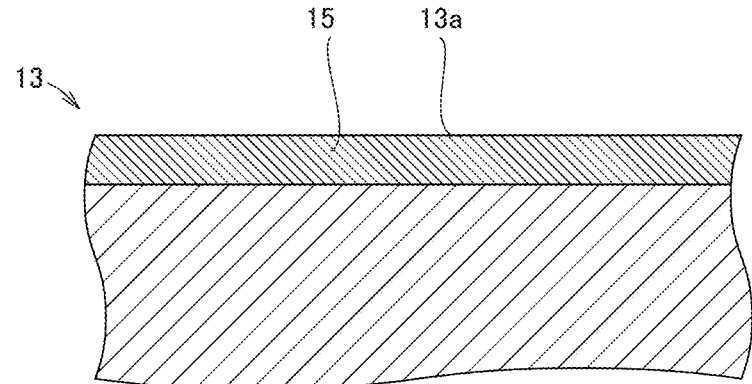

FIG. 2 is an enlarged cross sectional view of rolling element 13 in the vicinity of outer peripheral surface 13a. As shown in FIG. 2, rolling element 13 includes a quench-hardened layer 15 in outer peripheral surface 13a. Quench-hardened layer 15 is a layer hardened by performing quenching. Quench-hardened layer 15 includes a plurality of martensite crystal grains.

When a deviation is more than or equal to 15° between the crystal orientation of a first martensite crystal grain and the crystal orientation of a second martensite crystal grain adjacent to the first martensite crystal grain, the first and second martensite crystal grains are different martensite crystal grains. On the other hand, when the deviation is less than 15° between the crystal orientation of the first martensite crystal grain and the crystal orientation of the second martensite crystal grain adjacent to the first martensite crystal grain, the first and second martensite crystal grains constitute one martensite crystal grain.

Quench-hardened layer 15 has a structure mainly composed of a martensite phase. More specifically, a ratio of a total area of the plurality of martensite crystal grains in quench-hardened layer 15 is more than or equal to 70%. The ratio of the total area of the plurality of martensite crystal grains in quench-hardened layer 15 may be more than or equal to 80%.

In addition to the martensite crystal grains, quench-hardened layer 15 includes austenite crystal grains, ferrite crystal grains, and cementite ($Fe_3C$) crystal grains. A volume ratio of the austenite crystal grains in quench-hardened layer 15 is preferably less than or equal to 30%. The volume ratio of the austenite crystal grains in quench-hardened layer 15 is more preferably more than or equal to 20%. It should be noted that the volume ratio of the austenite crystal grains in quench-hardened layer 15 is measured by an X-ray diffraction method. More specifically, the volume ratio of the austenite crystal grains in quench-hardened layer 15 is calculated based on a ratio of the X-ray diffraction intensity of the austenite phase and the X-ray diffraction intensity of the other phases included in quench-hardened layer 15.

The plurality of martensite crystal grains are classified into a first group and a second group. A minimum value of crystal grain sizes of the martensite crystal grains belonging to the first group is larger than a maximum value of crystal grain sizes of the martensite crystal grains belonging to the second group.

A value obtained by dividing a total area of the martensite crystal grains belonging to the first group by the total area of the plurality of martensite crystal grains (the sum of the total area of the martensite crystal grains belonging to the first group and the total area of the martensite crystal grains belonging to the second group) is more than or equal to 0.5.

A value obtained by dividing, by the total area of the plurality of martensite crystal grains, the total area of the martensite crystal grains belonging to the first group except for a martensite crystal grain that has a minimum crystal grain size and that belongs to the first group is less than 0.5.

From another viewpoint, it can be said that the plurality of martensite crystal grains are assigned to the first group in the order from one having the largest crystal grain size. The assignment to the first group is ended when the total area of the martensite crystal grains assigned to the first group until then becomes 0.5 or more time as large as the total area of the plurality of martensite crystal grains. A remainder of the plurality of martensite crystal grains are assigned to the second group.

An average grain size of the martensite crystal grains belonging to the first group is less than or equal to 0.97 μm. The average grain size of the martensite crystal grains belonging to the first group is preferably less than or equal to 0.90 μm. The average grain size of the martensite crystal grains belonging to the first group is more preferably less than or equal to 0.85 μm.

An aspect ratio of each of the martensite crystal grains belonging to the first group is less than or equal to 2.57. The aspect ratio of each of the martensite crystal grains belonging to the first group is preferably less than or equal to 2.50. The aspect ratio of each of the martensite crystal grains belonging to the first group is more preferably less than or equal to 2.45.

The plurality of martensite crystal grains may be classified into a third group and a fourth group. A minimum value of crystal grain sizes of the martensite crystal grains belonging to the third group is larger than a maximum value of crystal grain sizes of the martensite crystal grains belonging to the fourth group.

A value obtained by dividing a total area of the martensite crystal grains belonging to the third group by the total area of the plurality of martensite crystal grains (the sum of the total area of the martensite crystal grains belonging to the third group and the total area of the martensite crystal grains belonging to the fourth group) is more than or equal to 0.7.

A value obtained by dividing, by the total area of the plurality of martensite crystal grains, the total area of the martensite crystal grains belonging to the third group except for a martensite crystal grain that has a minimum crystal grain size and that belongs to the third group is less than 0.7.

From another viewpoint, it can be said that the plurality of martensite crystal grains are assigned to the third group in the order from one having the largest crystal grain size. The assignment to the third group is ended when the total area of the martensite crystal grains assigned to the third group until then becomes 0.7 or more time as large as the total area of the plurality of martensite crystal grains. A remainder of the plurality of martensite crystal grains are assigned to the fourth group.

An average grain size of the martensite crystal grains belonging to the third group is less than or equal to 0.75 µm. The average grain size of the martensite crystal grains belonging to the third group is preferably less than or equal to 0.70 µm. The average grain size of the martensite crystal grains belonging to the third group is more preferably less than or equal to 0.65 µm.

An aspect ratio of each of the martensite crystal grains belonging to the third group is less than or equal to 2.45. The aspect ratio of each of the martensite crystal grains belonging to the third group is preferably less than or equal to 2.40. The aspect ratio of each of the martensite crystal grains belonging to the third group is more preferably less than or equal to 2.35.

The average crystal grain size of the martensite crystal grains belonging to the first group (third group) and the aspect ratio of each of the martensite crystal grains belonging to the first group (third group) are measured using an EBSD (Electron Backscattered Diffraction) method.

This will be described more in detail as follows. First, a cross section image (hereinafter, referred to as "EBSD image") in quench-hardened layer 15 is captured based on the EBSD method. The EBSD image is captured to include a sufficient number (more than or equal to 20) of martensite crystal grains. A boundary between adjacent martensite crystal grains is specified based on the EBSD image. Second, based on the specified boundary between the martensite crystal grains, the area and shape of each martensite crystal grain in the EBSD image are calculated.

More specifically, by calculating the square root of a value obtained by dividing the area of each martensite crystal grain in the EBSD image by $\pi/4$, the equivalent circle diameter of each martensite crystal grain in the EBSD image is calculated.

Based on the equivalent circle diameter of each martensite crystal grain calculated as described above, the martensite crystal grains belonging to the first group (third group) among the martensite crystal grains in the EBSD image are determined. The value obtained by dividing, by the total area of the martensite crystal grains in the EBSD image, the total area of the martensite crystal grains belonging to the first group (third group) among the martensite crystal grains in the EBSD image is regarded as the value obtained by dividing the total area of the martensite crystal grains belonging to the first group (third group) by the total area of the plurality of martensite crystal grains.

Based on the equivalent circle diameter of each martensite crystal grain calculated as described above, the martensite crystal grains in the EBSD image are classified into the first group and the second group (or classified into the third group and the fourth group). The value obtained by dividing, by the number of the martensite crystal grains classified into the first group (third group) in the EBSD image, the total of the equivalent circle diameters of the martensite crystal grains classified into the first group (third group) in the EBSD image is regarded as the average grain size of the martensite crystal grains belonging to the first group (third group).

From the shape of each martensite crystal grain in the EBSD image, the shape of each martensite crystal grain in the EBSD image is approximated to an ellipse by the least squares method. This approximation to an ellipse by the least squares method is performed in accordance with a method described in S. Biggin and D. J. Dingley, Journal of Applied Crystallography, (1977) 10, 376-378. By dividing the size in the major axis by the size in the minor axis in this elliptical shape, the aspect ratio of each martensite crystal grain in the EBSD image is calculated. A value obtained by dividing the total of the aspect ratios of the martensite crystal grains classified into the first group (third group) in the EBSD image by the number of the martensite crystal grains classified into the first group (third group) in the EBSD image is regarded as the average aspect ratio of the martensite crystal grains belonging to the first group (third group).

Quench-hardened layer 15 contains nitrogen. An average nitrogen concentration of quench-hardened layer 15 is preferably more than or equal to 0.05 mass % between outer peripheral surface 13a and a position at a distance of 10 µm from outer peripheral surface 13a. This average nitrogen concentration may be more than or equal to 0.10 mass %. This average nitrogen concentration is less than or equal to 0.20 mass %, for example. It should be noted that this average nitrogen concentration is measured using an EPMA (Electron Probe Micro Analyzer). The measurement of the average nitrogen concentration is preferably performed at the central position of the rolling contact surface in the axial direction (position at which an imaginary straight line that passes through the center of rolling element 13 in the direction along the central axis and that is orthogonal to the central axis intersects outer peripheral surface 13a). A penetration depth of the nitrogen in outer peripheral surface 13a at the central position of the rolling contact surface in the axial direction is preferably more than or equal to 0.2 mm. The penetration depth of the nitrogen is a depth until the concentration of the nitrogen measured using the EPMA becomes 0 mass %.

A hardness of quench-hardened layer 15 in outer peripheral surface 13a is preferably more than or equal to 730 Hv. It should be noted that the hardness of quench-hardened layer 15 in outer peripheral surface 13a is measured in accordance with JIS (JIS Z 2244: 2009).

<Detailed Configuration of Shaft 11>

Figure 3:
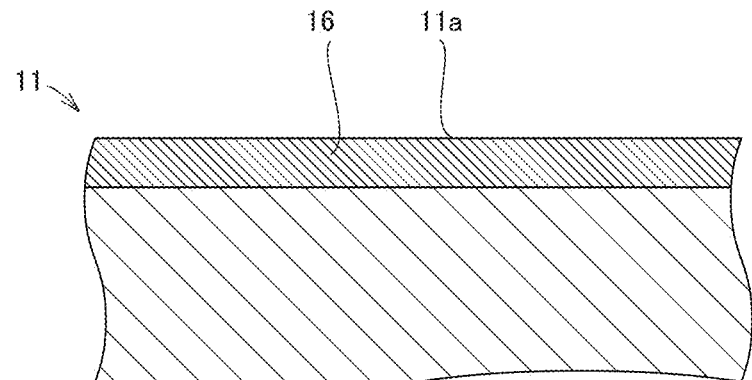

FIG. 3 is an enlarged cross sectional view of shaft 11 in the vicinity of outer peripheral surface 11a. As shown in FIG. 3, shaft 11 includes a quench-hardened layer 16 in outer peripheral surface 11a. The configuration of quench-hardened layer 16 is the same as the configuration of quench-hardened layer 15.

More specifically, quench-hardened layer 16 includes a plurality of martensite crystal grains. A ratio of a total area of the plurality of martensite crystal grains in quench-hardened layer 16 is more than or equal to 70% (preferably, more than or equal to 80%).

The plurality of martensite crystal grains in quench-hardened layer 16 are classified into a first group and a second group. A value obtained by dividing a total area of the martensite crystal grains belonging to the first group by the total area of the plurality of martensite crystal grains is more than or equal to 0.5. A value obtained by dividing, by the total area of the plurality of martensite crystal grains, the total area of the martensite crystal grains belonging to the first group except for a martensite crystal grain that has a minimum crystal grain size and that belongs to the first group is less than 0.5.

The average grain size of the martensite crystal grains belonging to the first group is less than or equal to 0.97 µm (preferably less than or equal to 0.90 µm, and more preferably less than or equal to 0.85 µm). The aspect ratio of each of the martensite crystal grains belonging to the first group is less than or equal to 2.57 (preferably less than or equal to 2.50 and more preferably less than or equal to 2.45).

The plurality of martensite crystal grains in quench-hardened layer 16 may be classified into a third group and a fourth group. A value obtained by dividing a total area of the martensite crystal grains belonging to the third group by the total area of the plurality of martensite crystal grains is more than or equal to 0.7. A value obtained by dividing, by the total area of the plurality of martensite crystal grains, the total area of the martensite crystal grains belonging to the third group except for a martensite crystal grain that has a minimum crystal grain size and that belongs to the third group is less than 0.7.

The average grain size of the martensite crystal grains belonging to the third group is less than or equal to 0.75 μm (preferably less than or equal to 0.70 μm, and more preferably less than or equal to 0.65 μm). The aspect ratio of each of the martensite crystal grains belonging to the third group is less than or equal to 2.45 (preferably less than or equal to 2.40 and more preferably less than or equal to 2.35).

Quench-hardened layer 16 contains nitrogen. An average nitrogen concentration of quench-hardened layer 16 is preferably more than or equal to 0.05 mass % between outer peripheral surface 11a and a position at a distance of 10 μm from outer peripheral surface 11a. This average nitrogen concentration may be more than or equal to 0.10 mass %. This average nitrogen concentration is less than or equal to 0.20 mass %, for example. The average nitrogen concentration is preferably measured at the central position of the rolling contact surface in the axial direction (position at which an imaginary straight line that passes through the center of rolling element 13 in the direction along the central axis and that is orthogonal to the central axis intersects outer peripheral surface 11a). A penetration depth of the nitrogen in outer peripheral surface 11a at the central position of the rolling contact surface in the axial direction is preferably more than or equal to 0.2 mm. The hardness of quench-hardened layer 16 in outer peripheral surface 11a is preferably more than or equal to 730 Hv. Moreover, the volume ratio of the austenite crystal grains in quench-hardened layer 16 is preferably less than or equal to 30% (preferably more than or equal to 20% and less than or equal to 30%).

The following describes a method for manufacturing rolling element 13.

Figure 4:
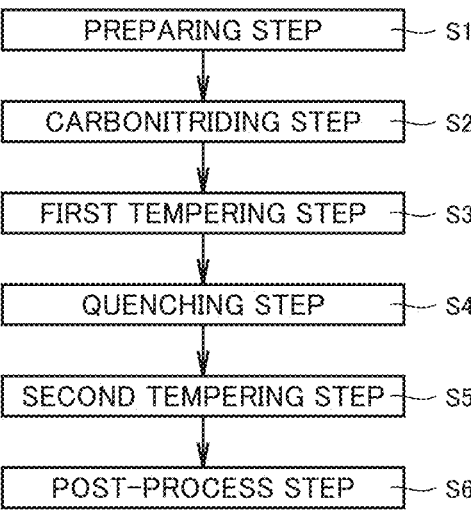
FIG. 4 is a process chart showing a method for manufacturing rolling element 13.

FIG. 4 is a process chart showing the method for manufacturing rolling element 13. As shown in FIG. 4, the method for manufacturing rolling element 13 includes a preparing step S1, a carbonitriding step S2, a first tempering step S3, a quenching step S4, a second tempering step S5, and a post-process step S6.

In preparing step S1, a processing target member having a cylindrical shape is prepared. The processing target member is formed into rolling element 13 by performing carbonitriding step S2, first tempering step S3, quenching step S4, second tempering step S5 and post-process step S6 thereto. In preparing step S1, first, the material of the processing target member is cut. In preparing step S1, second, the processing target member is subjected to cold forging or cold heading. In preparing step S1, third, cutting is performed to provide the processing target member with a shape close to the shape of rolling element 13 as required.

In carbonitriding step S2, first, by heating the processing target member to a temperature of more than or equal to a first temperature, the processing target member is carbonitrided. The first temperature is a temperature of more than or equal to an $A_1$ transformation point of the steel of the processing target member. In carbonitriding step S2, second, the processing target member is cooled. This cooling is performed such that the temperature of the processing target member becomes less than or equal to an Ms transformation point.

In first tempering step S3, the processing target member is tempered. First tempering step S3 is performed by holding the processing target member at a second temperature for a first period of time. The second temperature is a temperature of less than the $A_1$ transformation point. The second temperature is more than or equal to 160° C. and less than or equal to 200° C., for example. The first period of time is more than or equal to 1 hour and less than or equal to 4 hours, for example.

In quenching step S4, the processing target member is quenched. In quenching step S4, first, the processing target member is heated to a third temperature. The third temperature is a temperature of more than or equal to the $A_1$ transformation point of the steel of the processing target member. The third temperature is preferably lower than the first temperature. In quenching step S4, second, the processing target member is cooled. This cooling is performed such that the temperature of the processing target member becomes less than or equal to an Ms transformation point.

In second tempering step S5, the processing target member is tempered. Second tempering step S5 is performed by holding the processing target member at a fourth temperature for a second period of time. The fourth temperature is a temperature of less than the $A_1$ transformation point. The fourth temperature is more than or equal to 160° C. and less than or equal to 200° C., for example. The second period of time is more than or equal to 1 hour and less than or equal to 4 hours, for example. It should be noted that each of quenching step S4 and second tempering step S5 may be repeated multiple times.

In post-process step S6, the processing target member is post-processed. In post-process step S6, cleaning of the processing target member, machining of a surface of the processing target member, such as grinding or polishing, and the like are performed, for example. In this way, rolling element 13 is manufactured.

A method for manufacturing shaft 11 is the same as the method for manufacturing rolling element 13 and is therefore not described here in detail.

The following describes effects of rolling element 13 and shaft 11.

When material failure is considered in accordance with the weakest link model, portions each having a relatively low strength, i.e., martensite crystal grains each having a relatively large crystal grain size have a great influence on the material failure. In each of quench-hardened layer 15 and quench-hardened layer 16, the average grain size of the martensite crystal grains belonging to the first group (third group) is less than or equal to 0.97 μm (less than or equal to 0.75 μm). Accordingly, in each of rolling element 13 and shaft 11, even such relatively large martensite crystal grains belonging to the first group (third group) are fine crystal grains, with the result that rolling fatigue strength and static load capacity are improved.

As the average aspect ratio of the martensite crystal grains becomes smaller, the shape of each of the martensite crystal grains becomes closer to a spherical shape, with the result that stress concentration is less likely to take place. Accordingly, when the average aspect ratio of the martensite crystal grains belonging to the first group (third group) is less than or equal to 2.57 (less than or equal to 2.45), the rolling fatigue strength and static load capacity can be further improved.

Since the volume ratio of the austenite crystal grains in each of quench-hardened layer 15 and quench-hardened layer 16 is less than or equal to 30%, the hardness in each of outer peripheral surface 13a and outer peripheral surface 11a can be suppressed from being decreased while maintaining dimensional stability of each of rolling element 13 and shaft 11.

Second Embodiment

The following describes a configuration of a planetary gear mechanism bearing according to a second embodiment (hereinafter, also referred to as "bearing 20").

<Configuration of Planetary Gear Mechanism 30>

Figure 5:
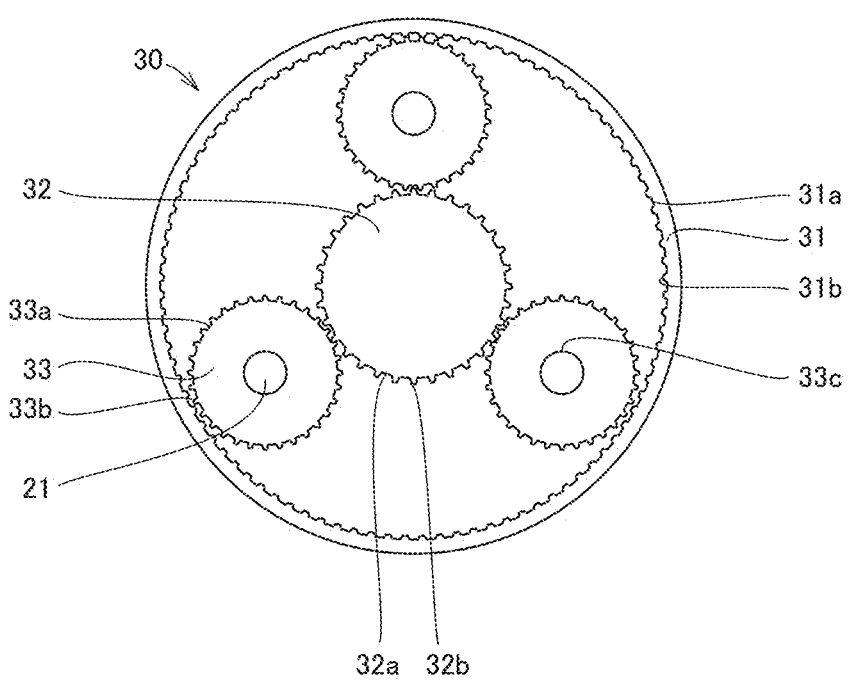
FIG. 5 is a schematic diagram of a planetary gear mechanism 30.

FIG. 5 is a schematic diagram of a planetary gear mechanism 30. As shown in FIG. 5, planetary gear mechanism 30 includes a ring gear 31 (internal gear), a sun gear 32 (sun gear), and a plurality of pinion gears 33 (planetary gears).

Ring gear 31 has a ring shape (annular shape). Ring gear 31 has an inner peripheral surface 31a. Internal teeth 31b are formed in inner peripheral surface 31a. Sun gear 32 has a disc shape. Sun gear 32 has an outer peripheral surface 32a. External teeth 32b are formed in outer peripheral surface 32a. Sun gear 32 is disposed at the center of ring gear 31. Each of pinion gears 33 has a disc shape. Pinion gear 33 has an outer peripheral surface 33a. External teeth 33b are formed in outer peripheral surface 33a. Pinion gear 33 is disposed between ring gear 31 and sun gear 32, and external teeth 33b are engaged with internal teeth 31b and external teeth 32b.

<Schematic Configuration of Bearing 20>

Figure 6:
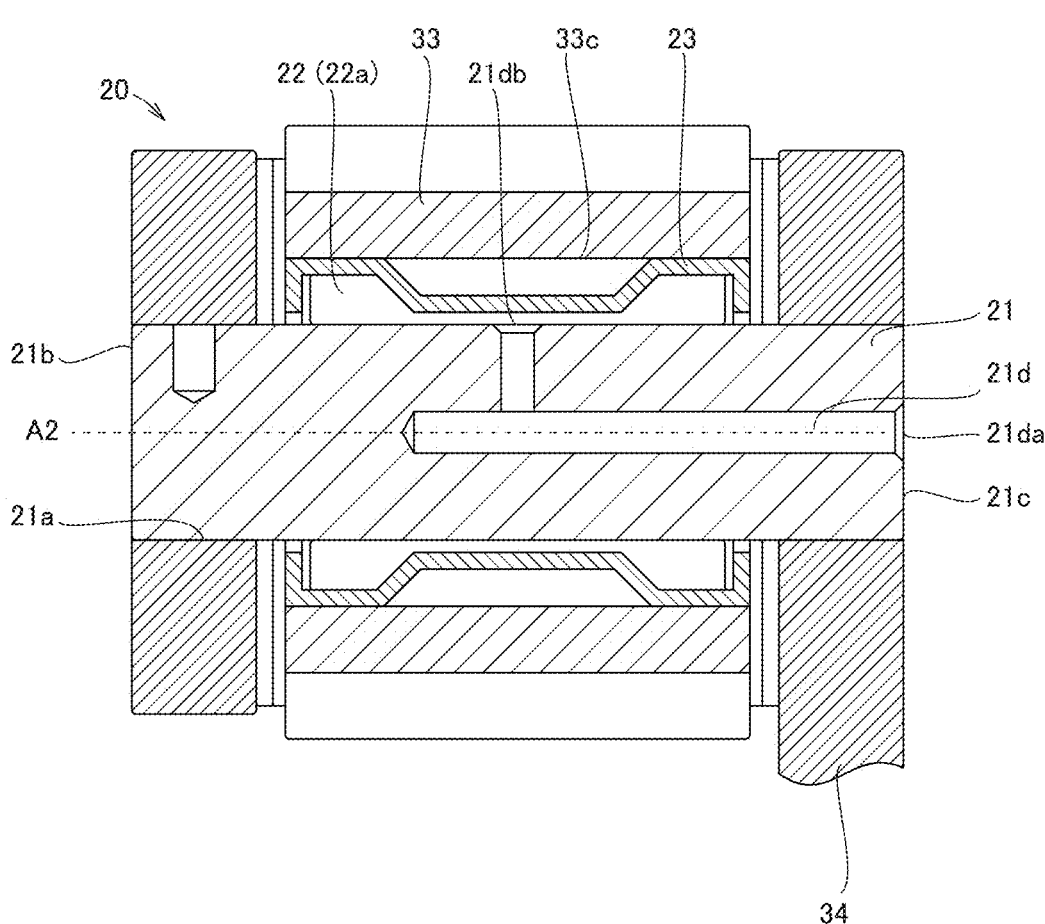
FIG. 6 is a cross sectional view of a bearing 20.

FIG. 6 is a cross sectional view of bearing 20. As shown in FIG. 6, bearing 20 includes a shaft 21, a rolling element 22, and a cage 23. Each of shaft 21 and rolling element 22 is composed of a steel. Each of shaft 21 and rolling element 22 is composed of high-carbon chromium bearing steel SUJ2 defined in JIS, for example. Each of shaft 21 and rolling element 22 may be composed of high-carbon chromium bearing steel SUJ3 defined in JIS, 52100 defined in ASTM, 100Cr6 defined in DIN, or GCr5 (GCr15) defined in GB.

Shaft 21 has a cylindrical shape extending along a central axis A2. Shaft 21 has an outer peripheral surface 21a. Outer peripheral surface 21a serves as a raceway surface. Shaft 21 is inserted into a through hole 33c formed in pinion gear 33. Outer peripheral surface 21a faces an inner wall surface of through hole 33c.

Shaft 21 has a first end 21b and a second end 21c in an axial direction (direction along central axis A2). Second end 21c is an end opposite to first end 21b in the axial direction. Shaft 21 is fixed to a carrier 34 at first end 21b and second end 21c. A revolution motion of pinion gear 33 is input and output from carrier 34.

An oil supply flow path 21d is formed inside shaft 21. Oil supply flow path 21d has a supply opening 21da opened at second end 21c and a discharge opening 21db opened at outer peripheral surface 21a. Lubricant supplied from supply opening 21da passes through oil supply flow path 21d and is discharged from discharge opening 21db. Thus, the lubricant is supplied to the surroundings of rolling element 22.

Rolling element 22 extends along the axial direction. Rolling element 22 has a cylindrical shape. Rolling element 22 is a needle roller, for example. Rolling element 22 has an outer peripheral surface 22a. Outer peripheral surface 22a serves as a rolling contact surface. Rolling element 22 is disposed between shaft 21 and pinion gear 33 such that outer peripheral surface 22a is in contact with outer peripheral surface 21a and the inner wall surface of through hole 33c. Thus, pinion gear 33 is supported rotatably about central axis A2 by bearing 20.

Cage 23 holds rolling element 22 so as to maintain an interval between rolling elements 22 in the peripheral direction (direction along the perimeter passing through central axis A2) to fall within a predetermined range.

<Detailed Configuration of Shaft 21>

Figure 7:
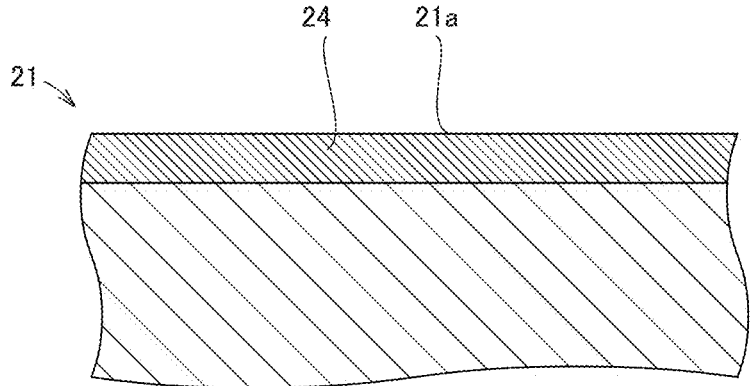

FIG. 7 is an enlarged cross sectional view of shaft 21 in the vicinity of outer peripheral surface 21a. As shown in FIG. 7, shaft 21 includes a quench-hardened layer 24 in outer peripheral surface 21a. The configuration of quench-hardened layer 24 is the same as the configuration of quench-hardened layer 15.

Quench-hardened layer 24 includes a plurality of martensite crystal grains. A ratio of a total area of the plurality of martensite crystal grains in quench-hardened layer 24 is more than or equal to 70% (preferably, more than or equal to 80%).

The plurality of martensite crystal grains in quench-hardened layer 24 are classified into a first group and a second group. A value obtained by dividing a total area of the martensite crystal grains belonging to the first group by the total area of the plurality of martensite crystal grains is more than or equal to 0.5. A value obtained by dividing, by the total area of the plurality of martensite crystal grains, the total area of the martensite crystal grains belonging to the first group except for a martensite crystal grain that has a minimum crystal grain size and that belongs to the first group is less than 0.5.

The average grain size of the martensite crystal grains belonging to the first group is less than or equal to 0.97 μm (preferably less than or equal to 0.90 μm, and more preferably less than or equal to 0.85 μm). The aspect ratio of the martensite crystal grains belonging to the first group is less than or equal to 2.57 (preferably less than or equal to 2.50 and more preferably less than or equal to 2.45).

The plurality of martensite crystal grains in quench-hardened layer 24 may be classified into a third group and a fourth group. A value obtained by dividing a total area of the martensite crystal grains belonging to the third group by the total area of the plurality of martensite crystal grains is more than or equal to 0.7. A value obtained by dividing, by the total area of the plurality of martensite crystal grains, the total area of the martensite crystal grains belonging to the third group except for a martensite crystal grain that has a minimum crystal grain size and that belongs to the third group is less than 0.7.

The average grain size of the martensite crystal grains belonging to the third group is less than or equal to 0.75 μm (preferably less than or equal to 0.70 μm, and more preferably less than or equal to 0.65 μm). The aspect ratio of each of the martensite crystal grains belonging to the third group is less than or equal to 2.45 (preferably less than or equal to 2.40 and more preferably less than or equal to 2.35).

Quench-hardened layer 24 contains nitrogen. An average nitrogen concentration of quench-hardened layer 24 is preferably more than or equal to 0.05 mass % between outer peripheral surface 21a and a position at a distance of 10 μm from outer peripheral surface 21a. This average nitrogen concentration may be more than or equal to 0.10 mass %. This average nitrogen concentration is less than or equal to 0.20 mass %, for example. The average nitrogen concentration is preferably measured at the central position of the rolling contact surface in the axial direction (position at which an imaginary straight line that passes through the center of rolling element 22 in the direction along the central axis and that is orthogonal to the central axis intersects outer peripheral surface 21a). A penetration depth of the nitrogen in outer peripheral surface 21a at the central position of the rolling contact surface in the axial direction is preferably more than or equal to 0.2 mm. A hardness of quench-hardened layer 24 in outer peripheral surface 21a is preferably more than or equal to 730 Hv. Moreover, the volume ratio of the austenite crystal grains in quench-hardened layer 24 is preferably less than or equal to 30% (preferably more than or equal to 20% and less than or equal to 30%).

The effect of the method for manufacturing shaft 21 and the effect of shaft 21 are the same as the effect of the method for manufacturing rolling element 13 and the effect of rolling element 13 and therefore are not described here in detail.

The following describes a rolling fatigue test and a static load capacity test, each of which was performed to confirm the effects of rolling element 13, shaft 11, and shaft 21.

<Test Specimens>

In each of the rolling fatigue test and the static load capacity test, samples 1, 2, and 3 were used. Each of samples 1 and 2 was composed of SUJ2. Sample 3 was composed of SCM435, which is a chromium-molybdenum steel defined in JIS (JIS G 4053: 2016).

Sample 1 was prepared by performing the same heat treatment as that for rolling element 13 (shaft 11 or shaft 21). More specifically, in the preparation of sample 1, the first temperature was set to 850° C., the second temperature was set to 180° C., the third temperature was set to 810° C., and the fourth temperature was set to 180° C. For each of samples 2 and 3, quenching step S4 and second tempering step S5 were not performed. In the preparation of sample 2, the first temperature was set to 850° C. and the second temperature was set to 180° C. In the preparation of sample 3, the first temperature was set to 930° C. and the second temperature was set to 170° C. The heat treatment conditions for samples 1 to 3 are shown in Table 1.

TABLE 1

| | First Temperature (° C.) | Second Temperature (° C.) | Third Temperature (° C.) | Fourth Temperature (° C.) |
|---|---|---|---|---|
| Sample 1 | 850 | 180 | 810 | 180 |
| Sample 2 | 850 | 180 | — | — |
| Sample 3 | 930 | 170 | — | — |

It should be noted that in each of samples 1 to 3, at a position at a distance of 50 μm from the surface, the ratio of the total area of the austenite crystal grains was more than or equal to 20% and less than or equal to 30%, the nitrogen concentration in the surface was more than or equal to 0.15 mass % and less than or equal to 0.20 mass %, and the hardness in the surface was 730 Hv.

In sample 1, the average grain size of the martensite crystal grains belonging to the first group was 0.80 μm, and the average aspect ratio of the martensite crystal grains belonging to the first group was 2.41. Moreover, in sample 1, the average grain size of the martensite crystal grains belonging to the third group was 0.64 μm, and the average aspect ratio of the martensite crystal grains belonging to the third group was 2.32.

In sample 2, the average grain size of the martensite crystal grains belonging to the first group was 1.11 μm, and the average aspect ratio of the martensite crystal grains belonging to the first group was 3.00. Moreover, in sample 2, the average grain size of the martensite crystal grains belonging to the third group was 0.84 μm, and the average aspect ratio of the martensite crystal grains belonging to the third group was 2.77.

In sample 3, the average grain size of the martensite crystal grains belonging to the first group was 1.81 μm, and the average aspect ratio of the martensite crystal grains belonging to the first group was 3.38. Moreover, in sample 2, the average grain size of the martensite crystal grains belonging to the third group was 1.28 μm, and the average aspect ratio of the martensite crystal grains belonging to the third group was 3.04.

Table 2 shows results of measurements of the average grain size and average aspect ratio of the martensite crystal grains in each of samples 1 to 3.

TABLE 2

| | First Group of Martensite Crystal Grains | | Third Group of Martensite Crystal Grains | |
|---|---|---|---|---|
| | Average Grain Size (μm) | Average Aspect Ratio | Average Grain Size (μm) | Average Aspect Ratio |
| Sample 1 | 0.80 | 2.41 | 0.64 | 2.32 |
| Sample 2 | 1.11 | 3.00 | 0.84 | 2.77 |
| Sample 3 | 1.81 | 3.38 | 1.28 | 3.04 |

Figure 8:
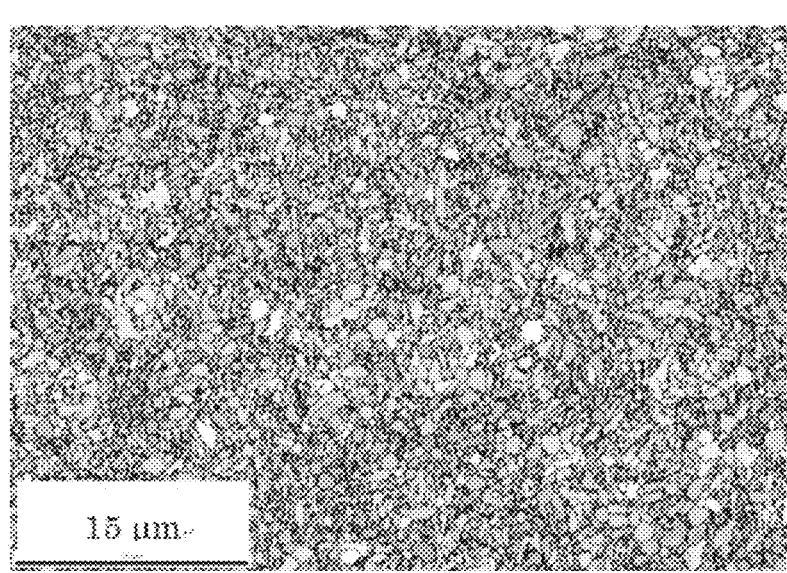
FIG. 8 shows an EBSD image at a cross section of a sample 1.
Figure 9:
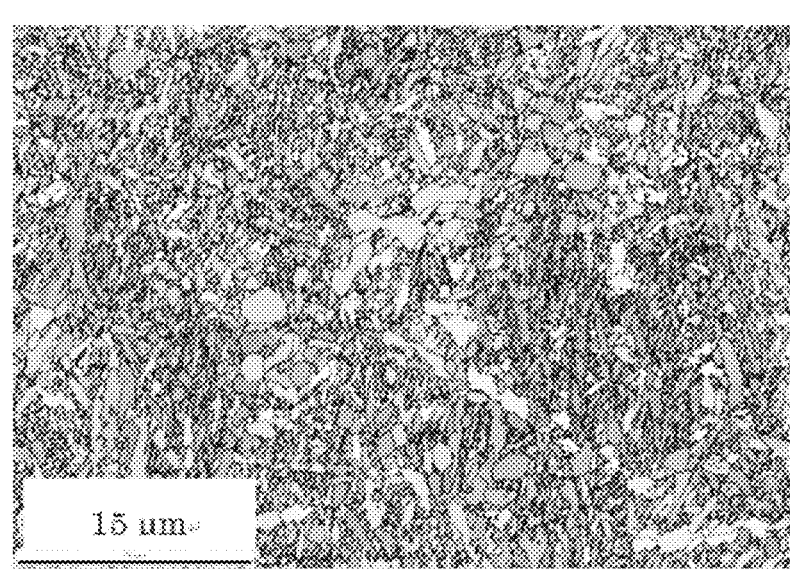
FIG. 9 shows an EBSD image at a cross section of a sample 2.
Figure 10:
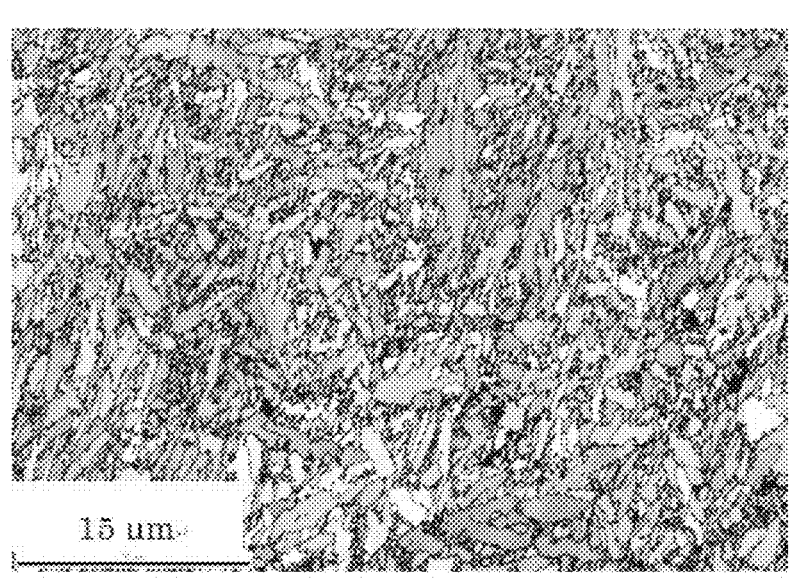
FIG. 10 shows an EBSD image at a cross section of a sample 3.

FIG. 8 shows an EBSD image at a cross section of sample 1. FIG. 9 shows an EBSD image at a cross section of sample 2. FIG. 10 shows an EBSD image at a cross section of sample 3. As shown in FIG. 8 to FIG. 10, it is understood that the martensite crystal grains in sample 1 are finer than those in each of samples 2 and 3.

<Rolling Fatigue Test Conditions>

In the rolling fatigue test, an inner ring, an outer ring, and a tapered roller were prepared using each of samples 1 and 3, and were used to produce a tapered roller bearing. The rolling fatigue test was performed under conditions that the rotating speed of the inner ring was 3000 rotations/min and the maximum contact pressure was 2.6 GPa. In the rolling fatigue test, bath lubrication was performed using VG56, which is a turbine oil. In this turbine oil, hard gas-atomized powder was mixed at a ratio of 0.2 g/l. The test conditions for the rolling fatigue test are shown in Table 3. It should be noted that the rolling fatigue test was performed onto six tapered roller bearings each produced using sample 1 and six tapered roller bearings each produced using sample 3.

TABLE 3

| | |
|---|---|
| Maximum Contact Pressure (GPa) | 2.6 |
| Rotating Speed of Inner Ring (min⁻¹) | 3000 |
| Lubrication | Bath Lubrication with Turbine Oil (VG56) |
| Special Note | 0.2 g/l of Hard Gas-Atomized Powder is Mixed in Lubricating Oil. |

<Static Load Capacity Test Conditions>

In the static load capacity test, flat plate-like members were produced using samples 1 to 3. The static load capacity test was performed by finding a relation between the maximum contact pressure and the indentation depth by pressing a ceramic ball composed of silicon nitride against a surface of each of the flat plate-like members having been mirror-finished. It should be noted that the static load capacity was evaluated in accordance with the maximum contact pressure when a value obtained by dividing the indentation depth by the diameter of the ceramic ball reached 1/10000 (when a value obtained by dividing the indentation depth by the diameter of the ceramic ball and multiplying by 10000 reached 1).

<Rolling Fatigue Test Results>

Each of the tapered roller bearings prepared using sample 1 had an $L_{50}$ life (50% failure life) of 50.4 hours. On the other hand, each of the tapered roller bearings prepared using sample 3 had an $L_{50}$ life of 31.2 hours. Thus, each of the tapered roller bearings produced using sample 1 had a rolling fatigue life improved twice or more as compared with that in each of the tapered roller bearings produced using sample 3. This test result is shown in Table 4.

TABLE 4

|  | Sample 1 | Sample 3 |
| --- | --- | --- |
| $L_{50}$ Life (Hours) | 50.4 | 31.2 |
| Number of Samples for Test | 6 | 6 |

Figure 11:
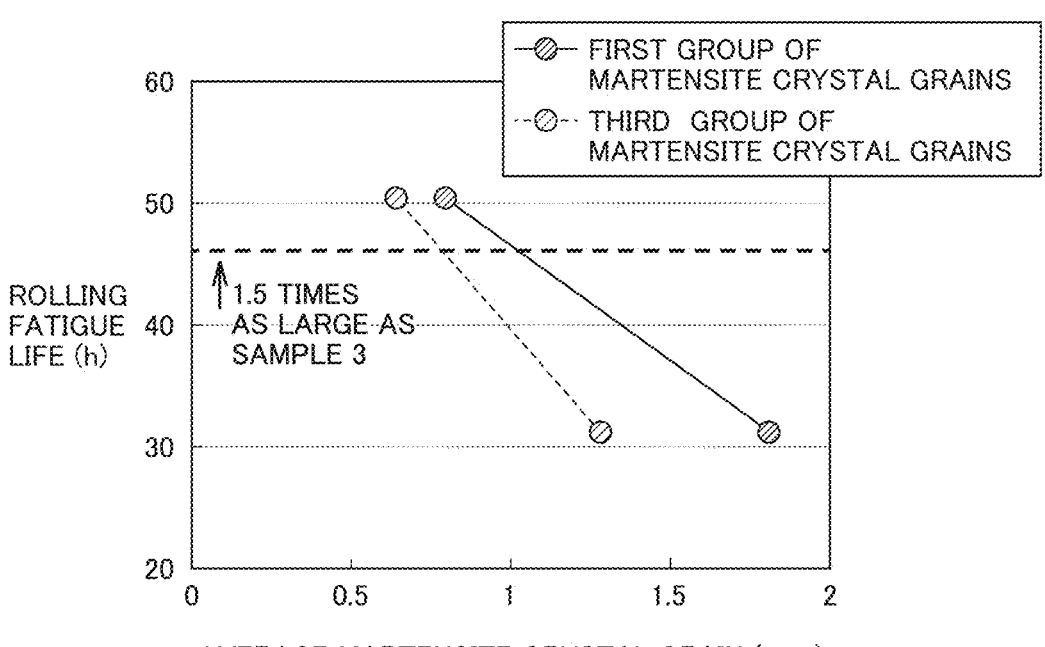
FIG. 11 is a graph showing a relation between an average grain size of martensite crystal grains and a rolling fatigue life.
Figure 12:
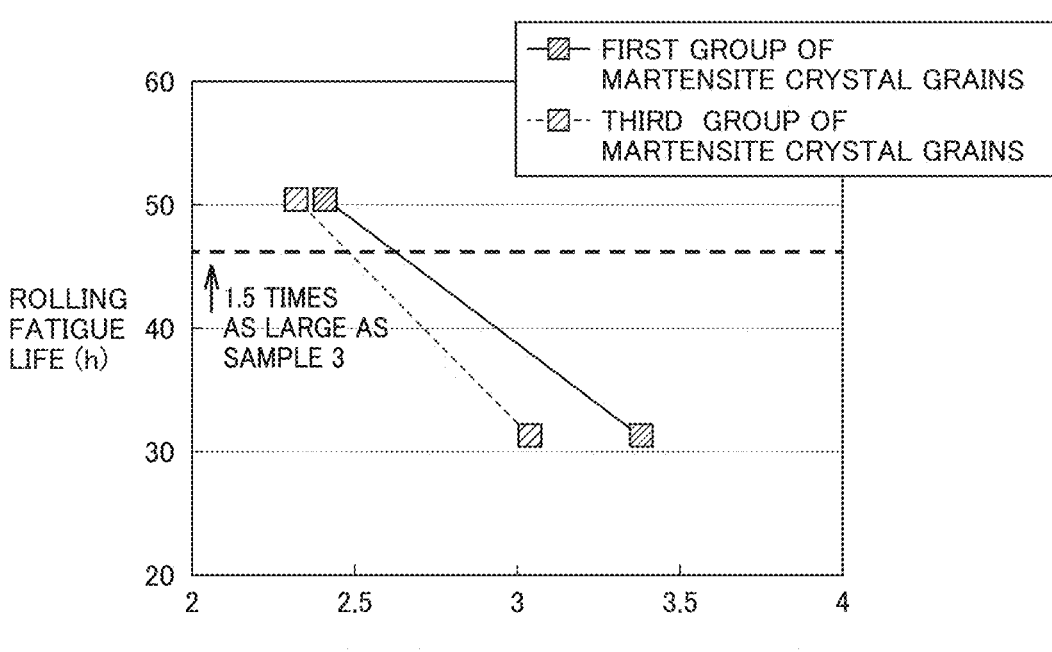
FIG. 12 is a graph showing a relation between an average aspect ratio of the martensite crystal grains and the rolling fatigue life.

FIG. 11 is a graph showing a relation between the average grain size of the martensite crystal grains and the rolling fatigue life. FIG. 12 is a graph showing a relation between the average aspect ratio of the martensite crystal grains and the rolling fatigue life. In FIG. 11, the horizontal axis represents the average grain size (unit: μm) of the martensite crystal grains, and the vertical axis represents rolling fatigue life $L_{50}$ (unit: hour). In FIG. 12, the horizontal axis represents the average aspect ratio of the martensite crystal grains, and the vertical axis represents rolling fatigue life $L_{50}$ (unit:hour).

As shown in FIG. 11 and FIG. 12, rolling fatigue life $L_{50}$ was more improved as the average grain size of the martensite crystal grains belonging to the first group (third group) was smaller, and rolling fatigue life $L_{50}$ was more improved as the average aspect ratio of the martensite crystal grains belonging to the first group (third group) was smaller.

<Static Load Capacity Test Results>

Figure 13:
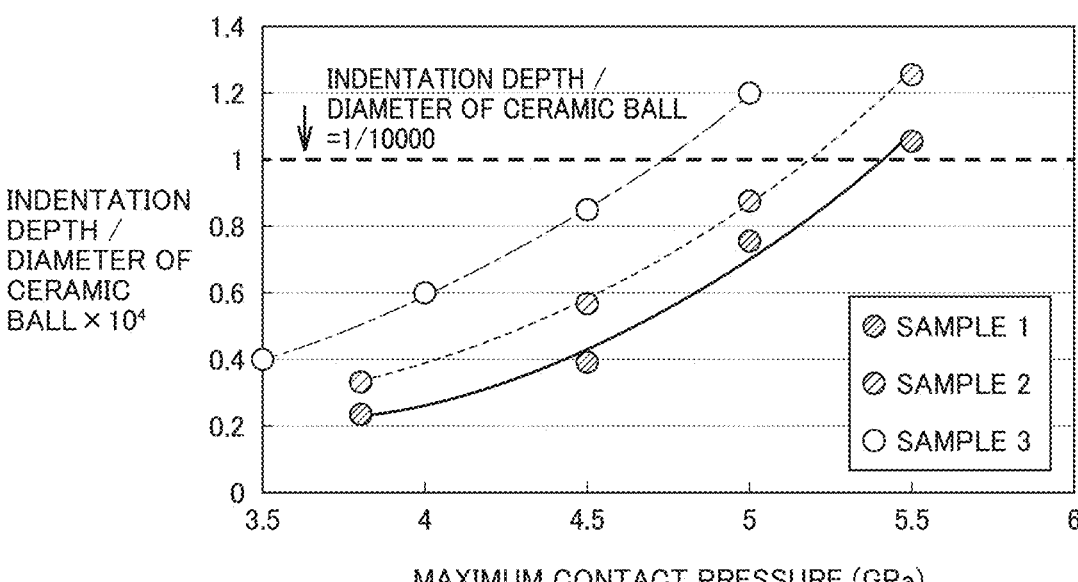
FIG. 13 is a graph showing a relation between a maximum contact pressure and an indentation depth.

FIG. 13 is a graph showing a relation between the maximum contact pressure and the indentation depth. In FIG. 13, the horizontal axis represents the maximum contact pressure (unit: GPa), and the vertical axis represents a value obtained as follows: the indentation depth/the diameter of the ceramic ball×$10^4$. As shown in FIG. 13, when the value of the vertical axis was 1, the value of the maximum contact pressure in a curve corresponding to sample 1 was larger than those in curves corresponding to samples 2 and 3. That is, the value of the static load capacity in sample 1 was larger than each of those in samples 2 and 3.

Figure 14:
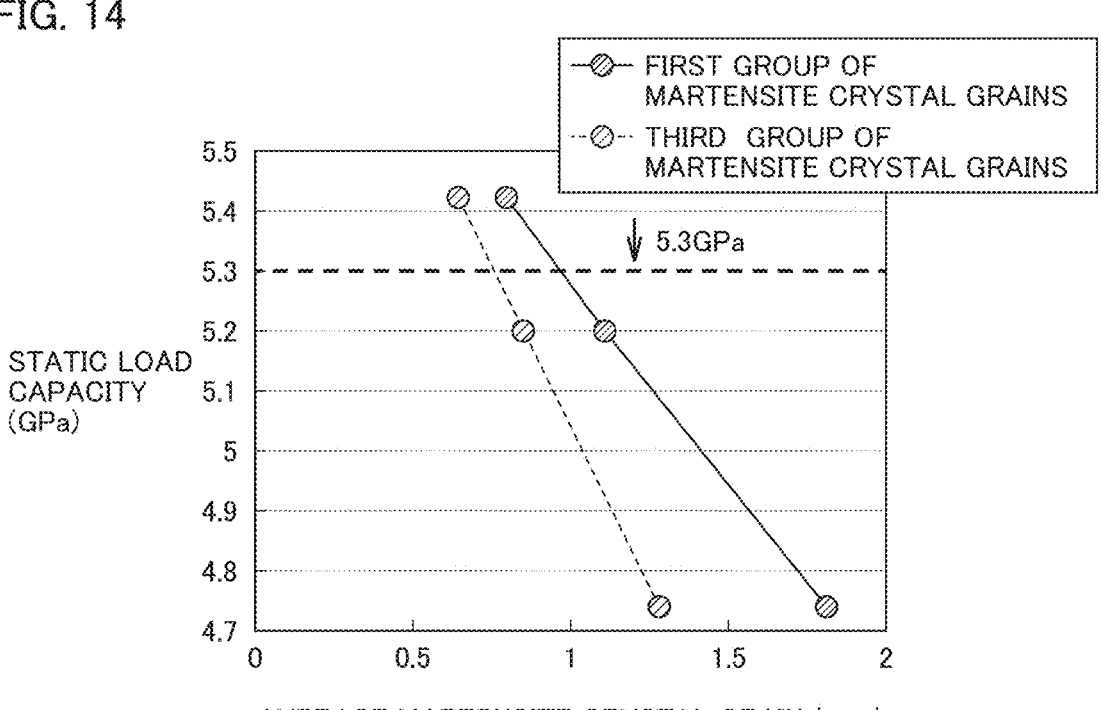
FIG. 14 is a graph showing a relation between the average grain size of the martensite crystal grains and a static load capacity.
Figure 15:
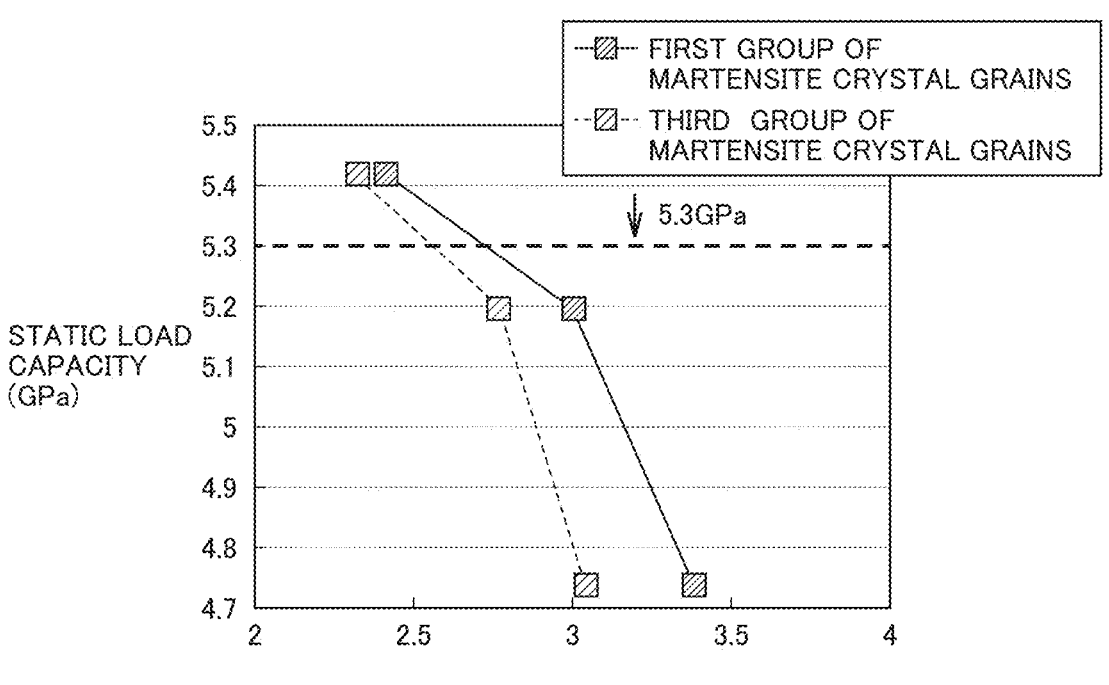
FIG. 15 is a graph showing a relation between the average aspect ratio of the martensite crystal grains and the static load capacity.

FIG. 14 is a graph showing a relation between the average grain size of the martensite crystal grains and the static load capacity. FIG. 15 is a graph showing a relation between the average aspect ratio of the martensite crystal grains and the static load capacity. In FIG. 14, the horizontal axis represents the average grain size (unit: μm) of the martensite crystal grains, and the vertical axis represents the static load capacity (unit: GPa). In FIG. 15, the horizontal axis represents the average aspect ratio of the martensite crystal grains, and the vertical axis represents the static load capacity (unit: GPa).

As shown in FIG. 14 and FIG. 15, the static load capacity was more improved as the average grain size of the martensite crystal grains belonging to the first group (third group) was smaller, and the static load capacity was more improved as the average aspect ratio of the martensite crystal grains belonging to the first group (third group) was smaller. In view of this as well as the results shown in FIG. 11 and FIG. 12, when the average grain size of the martensite crystal grains belonging to the first group (third group) is less than or equal to 0.97 μm (less than or equal to 0.75 μm) and the average aspect ratio of the martensite crystal grains belonging to the first group (third group) is less than or equal to 2.57 (less than or equal to 2.45), it is possible to achieve a rolling fatigue life $L_{50}$ that is 1.5 or more times as large as rolling fatigue life $L_{50}$ of the conventional one (i.e., rolling fatigue life $L_{50}$ of sample 3) and it is possible to achieve a static load capacity of more than or equal to 5.3 GPa.

From such test results, it has been also experimentally indicated that the rolling fatigue strength and static load capacity of rolling element 13 (shaft 11, or shaft 21) are improved because quench-hardened layer 15 (quench-hardened layer 16, or quench-hardened layer 24) is included.

Although the embodiments of the present invention have been illustrated, the embodiments described above can be modified in various manners. Further, the scope of the present invention is not limited to the above-described embodiments. The scope of the present invention is defined by the terms of the claims, and is intended to include any modifications within the scope and meaning equivalent to the terms of the claims.

INDUSTRIAL APPLICABILITY

The above embodiments are particularly advantageously applied to a rolling element of a rocker arm bearing, a shaft of the rocker arm bearing, and a shaft of a planetary gear mechanism bearing.

REFERENCE SIGNS LIST

10: bearing; 11: shaft; 11a: outer peripheral surface; 11b: first end; 11c: second end; 12: outer ring; 12a: upper surface; 12b: bottom surface; 12c: inner peripheral surface; 12d: outer peripheral surface; 13: rolling element; 13a: outer peripheral surface; 14: rocker arm; 15: quench-hardened layer; 16: quench-hardened layer; 20: bearing; 21: shaft; 21a: outer peripheral surface; 21b: first end; 21c: second end; 21d: oil supply flow path; 21da: supply opening; 21db: discharge opening; 22: rolling element; 22a: outer peripheral surface; 23: cage; 24: quench-hardened layer; 30: planetary gear mechanism; 31: ring gear; 31a: inner peripheral surface; 31b: internal teeth; 32: sun gear; 32a: outer peripheral surface; 32b: external teeth; 33: pinion gear; 33a: outer peripheral surface; 33b: external teeth; 33c: through hole; 34: carrier; $A_1$, A2: central axis; S1: preparing step; S2: carbonitriding step; S3: first tempering step; S4: quenching step; S5: second tempering step; S6: post-process step.

The invention claimed is:

1. A bearing comprising:

a shaft; and a rolling element, wherein each of the shaft and the rolling element is composed of a steel, a quench-hardened layer is formed on a surface of the shaft and the rolling element, the quench-hardened layer includes a plurality of martensite crystal grains, a ratio of a total area of the plurality of martensite crystal grains in the quench-hardened layer is more than or equal to 70%, the plurality of martensite crystal grains are classified into a first group and a second group, a minimum value of crystal grain sizes of the martensite crystal grains belonging to the first group is larger than a maximum value of crystal grain sizes of the martensite crystal grains belonging to the second group, a value obtained by dividing a total area of the martensite crystal grains belonging to the first group by the total area of the plurality of martensite crystal grains is more than or equal to 0.5, a value obtained by dividing, by the total area of the plurality of martensite crystal grains, a total area of the martensite crystal grains belonging to the first group except for a martensite crystal grain that has a minimum crystal grain size and that belongs to the first group is less than 0.5, an average grain size of the martensite crystal grains belonging to the first group is less than or equal to 0.97 μm, the steel is high-carbon chromium bearing steel SUJ2 defined in JIS, the quench-hardened layer contains nitrogen, and an average nitrogen concentration of the quench-hardened layer is more than or equal to 0.05 mass % and less than or equal to 0.15 mass % between the surface and a position at a distance of 10 μm from the surface.

2. The bearing according to claim 1, wherein a hardness of the quench-hardened layer in the surface is more than or equal to 730 Hv.

3. The bearing according to claim 1, wherein the quench-hardened layer includes a plurality of austenite crystal grains, and a volume ratio of the plurality of austenite crystal grains in the quench-hardened layer is less than or equal to 30%.

* * * * *